(12) United States Patent
Strandberg et al.

(10) Patent No.: US 11,235,995 B2
(45) Date of Patent: Feb. 1, 2022

(54) PUMP STATION ARRANGEMENT AND METHOD FOR REMOVING HARMFUL FLUIDS FROM WASTEWATER

(71) Applicant: Xylem IP Management S.à r.l., Senningerberg (LU)

(72) Inventors: Tore Strandberg, Älvsjö (SE); Per Hedmark, Sundbyberg (SE)

(73) Assignee: Xylem Europe GmbH

( * ) Notice: Subject to any disclaimer, the term of this patent is extended or adjusted under 35 U.S.C. 154(b) by 429 days.

(21) Appl. No.: 16/062,254

(22) PCT Filed: Dec. 12, 2016

(86) PCT No.: PCT/EP2016/080585
§ 371 (c)(1),
(2) Date: Jun. 14, 2018

(87) PCT Pub. No.: WO2017/102627
PCT Pub. Date: Jun. 22, 2017

(65) Prior Publication Data
US 2019/0226473 A1    Jul. 25, 2019

(30) Foreign Application Priority Data
Dec. 16, 2015   (EP) ..................................... 15200452

(51) Int. Cl.
*C02F 1/74*   (2006.01)
*F04B 51/00*  (2006.01)
(Continued)

(52) U.S. Cl.
CPC ................ *C02F 1/74* (2013.01); *F04B 15/00* (2013.01); *F04B 23/02* (2013.01); *F04B 23/04* (2013.01);
(Continued)

(58) Field of Classification Search
CPC .......... F04B 49/22; F04B 41/06; F04B 23/02; F04B 23/04; F04B 15/00; F04B 51/00;
(Continued)

(56) References Cited

U.S. PATENT DOCUMENTS 3,789,986 A * 2/1974 Oldham ................... C02F 1/006
                                                          210/121
4,608,157 A * 8/1986 Graves .................... C02F 3/1242
                                                          210/104
(Continued)

FOREIGN PATENT DOCUMENTS

EP      1970353 A1 * 9/2008  ................ C02F 1/74
WO      9919726 A1   4/1999
(Continued)

OTHER PUBLICATIONS

International Search Report and Written Opinion for International Application No. PCT/EP2016/080585, dated Mar. 15, 2017—9 pages.

*Primary Examiner* — Nathan C Zollinger
(74) *Attorney, Agent, or Firm* — RatnerPrestia

(57) ABSTRACT

A pump station arrangement for removing harmful fluids from wastewater and a method for removing harmful fluids from wastewater in such a pump station arrangement. The pump station arrangement includes a pre-chamber, a pump sump, a recirculation channel extending from the pump sump to the pre-chamber, and a gas sensor arranged in the pump sump and configured to measure the content of harmful fluids in the form of gas in the pump sump. The pump station arrangement is configured to recirculate the wastewater via the recirculation channel from the pump sump to the pre-chamber if the measured content of harmful fluids in the form of gas in the pump sump exceed a predetermined value. Also disclosed is.

21 Claims, 1 Drawing Sheet

(51) Int. Cl.
*F04B 23/02* (2006.01)
*F04B 23/04* (2006.01)
*F04B 15/00* (2006.01)
*F04B 49/22* (2006.01)
*C02F 101/10* (2006.01)

(52) U.S. Cl.
CPC .............. *F04B 49/22* (2013.01); *F04B 51/00* (2013.01); *C02F 2101/101* (2013.01); *C02F 2209/26* (2013.01); *C02F 2301/046* (2013.01)

(58) Field of Classification Search
CPC ............... C02F 2101/101; C02F 1/006; B01D 19/0063; B01D 19/0047; E03F 5/18
See application file for complete search history.

(56) References Cited

U.S. PATENT DOCUMENTS

| | | | |
|---|---|---|---|
| RE32,312 E * | 12/1986 | Crates | C02F 1/006 |
| | | | 210/532.2 |
| 5,330,653 A * | 7/1994 | Vroman | A61L 2/18 |
| | | | 210/631 |
| 5,427,679 A | 6/1995 | Daniels | |
| 5,578,202 A * | 11/1996 | Hirane | C02F 3/302 |
| | | | 210/150 |
| 5,667,651 A * | 9/1997 | Bryan | B01D 53/1412 |
| | | | 204/401 |
| 6,136,204 A * | 10/2000 | Krejci | B01D 19/0005 |
| | | | 134/10 |
| 6,287,469 B1 * | 9/2001 | Ashburn | C02F 3/30 |
| | | | 210/605 |
| 7,442,307 B2 * | 10/2008 | Czepek | C02F 3/1263 |
| | | | 210/620 |
| 9,139,457 B2 * | 9/2015 | Hatten | B05B 3/063 |
| 9,181,106 B2 * | 11/2015 | Clidence | C02F 1/008 |
| 10,094,493 B2 * | 10/2018 | Disbrow | F16L 11/12 |
| 2004/0099589 A1 | 5/2004 | Terry | |
| 2013/0056423 A1 * | 3/2013 | Linguist | C02F 1/74 |
| | | | 210/741 |
| 2014/0166558 A1 * | 6/2014 | Sabo | C02F 3/1242 |
| | | | 210/142 |

FOREIGN PATENT DOCUMENTS

| | | | | |
|---|---|---|---|---|
| WO | | 2013090518 A1 | 6/2013 | |
| WO | WO-2013090518 A1 * | | 6/2013 | ......... B01D 19/0021 |

\* cited by examiner

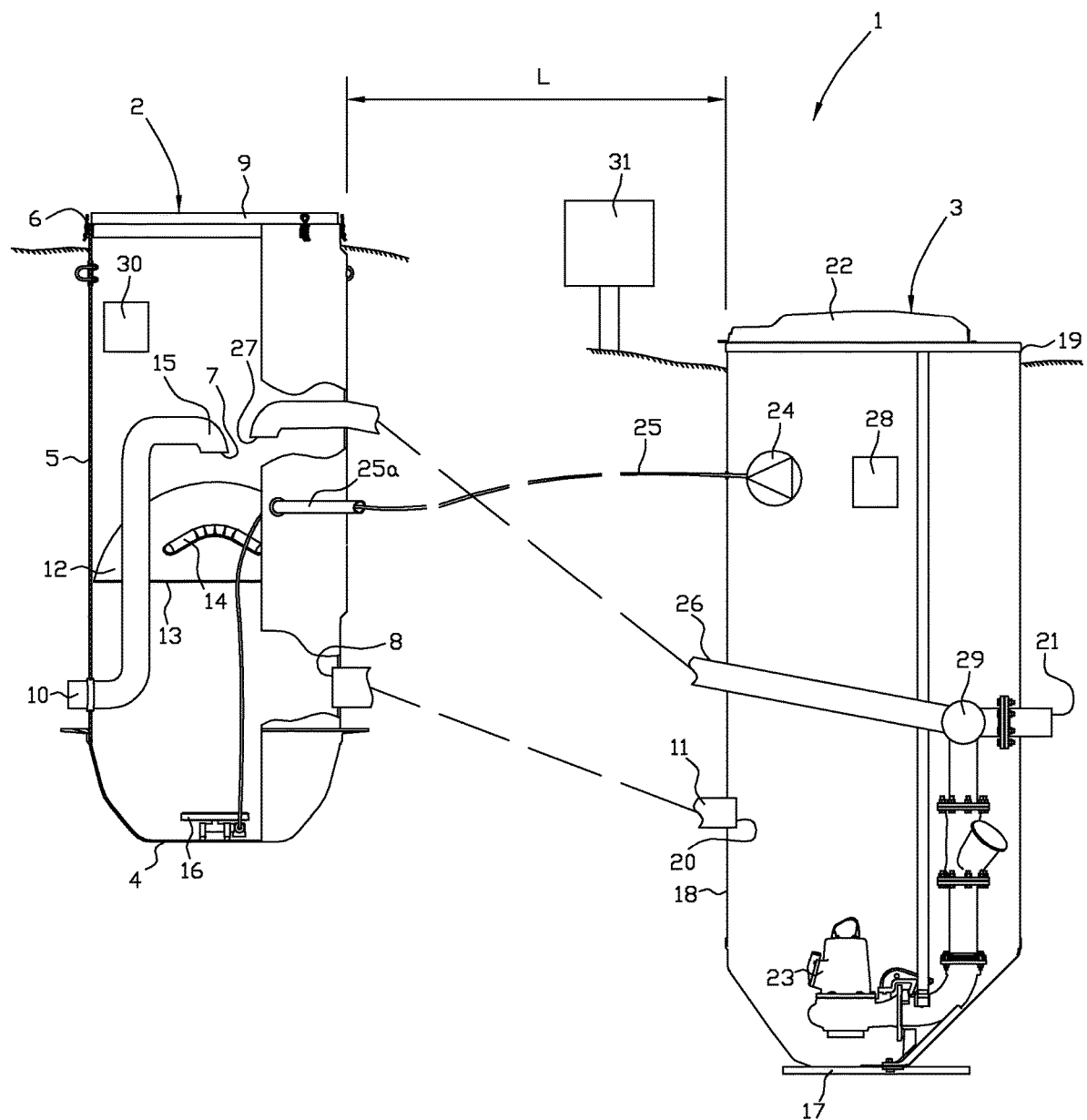

PUMP STATION ARRANGEMENT AND METHOD FOR REMOVING HARMFUL FLUIDS FROM WASTEWATER

CROSS-REFERENCE TO RELATED APPLICATIONS

This patent application is a U.S. National Phase Patent Application of PCT Application No. PCT/EP2016/080585, filed Dec. 12, 2016, which claims priority to European Patent Application No. 15200452.9, filed Dec. 16, 2015, each of which is incorporated by reference herein in its entirety.

TECHNICAL FIELD OF THE INVENTION

The present invention relates in general to a pump station arrangement, i.e. a hub in a wastewater transportation system. The present invention relates specifically to a pump station arrangement as well as a method for removing harmful fluids from wastewater during transportation of the wastewater.

The pump station arrangement comprises a pre-chamber having an inlet for influent wastewater and an outlet, and a pump sump having an outlet for effluent wastewater and an inlet that is in fluid communication with the outlet of the pre-chamber such that the wastewater is transported from the pre-chamber to the pump sump under the influence of gravity.

BACKGROUND OF THE INVENTION

In connection with inhabited regions, especially sparsely populated regions that are located at such a location that the wastewater generated by those living in the region must be pumped to a greater sewage system or to a sewage treatment plant, at least one pump station is present to which a number of households are connected. Such a pump station installation is usually fully functional and does not disturb those living in the region.

However, problem may arise for instance in connection with a pump station serving few households in a sparsely populated region. The structure of such an inhabited region involve long piping from each household to the pump station and relatively small flows of wastewater, which bring about that the wastewater risk to be standing in the piping during long periods of time. When the wastewater is stagnant in the piping, biological degradation processes of the organic material present in the wastewater will consume all the available oxygen in the piping. This entail that further degradation of the organic material in the waste water will be anaerobic, i.e. without access to oxygen, leading to the generation of hydrogen sulphide ($H_2S$), and other possible harmful fluids. The hydrogen sulphide is conveyed by the wastewater, dissolved in the waste water and/or as a gas, to the pump station and causes several problems.

One big problem for those living in the area of the pump station installation, is that the hydrogen sulphide generates a most unpleasant smell even at very low concentrations, that is easily spread in the housing area due to the fact that pump stations are not completely air tight, in fact the pump station is usually vented to the surrounding atmosphere. A big problem for the pump station as such is that the hydrogen sulphide also causes metal components as well as concrete components to corrode. To the group of metal components belongs for instance pumps, electronic, sensors, bracings, etc, and to the group concrete components belongs for instance pump sumps, sewage pipelines, etc.

Thereto, hydrogen sulphide, when present in high concentration in the air, is very harmful to inhale. The hydrogen sulphide may cause paralysis of the respiration system, leading to unconsciousness, of the person inhaling air having a high concentration of hydrogen sulphide. This is also a problem for the maintenance staff performing service and cleaning of the pump station.

Known ways of trying to solve above mentioned problems are for instance to add chemicals containing oxygen to the wastewater, to reduce the dwell time in the piping to a minimum.

OBJECT OF THE INVENTION

The present invention aims at providing an improved pump station arrangement and a method for removing harmful fluids from the wastewater.

A basic object of the present invention is to provide an improved pump station arrangement, or wastewater installation, of initially defined type, which is easy to install and call for little or no maintenance/supervision.

Another object of the present invention is to provide a pump station arrangement that prevents different components present in the pump station to be subjected to corrosion.

It is another object of the present invention to provide a pump station arrangement that does not emit any unpleasant smell.

It is another object of the present invention to provide a pump station arrangement, in which the content of harmful fluids in the form of gas in the pump sump is below predetermined limits in order to protect the maintenance staff from injuries due to the harmful fluids.

BRIEF DESCRIPTION OF THE INVENTION

According to the invention at least the basic object is attained by means of the initially defined pump station arrangement and method, having the features defined in the independent claims. Preferred embodiments of the present invention are further defined in the dependent claims.

According to a first aspect of the present invention it is provided a pump station arrangement of the initially defined type and furthermore comprises a recirculation channel extending from the pump sump to the pre-chamber, and a gas sensor arranged in the pump sump and configured to measure the content of harmful fluids in the form of gas in the pump sump, wherein the pump station arrangement is configured to recirculate the wastewater via the recirculation channel from the pump sump to the pre-chamber if the measured content of harmful fluids in the form of gas in the pump sump exceed a predetermined value.

According to a second aspect of the present invention it is provided a method for removing harmful fluids in such a pump station arrangement. The method comprises the steps of measuring the content of harmful fluids in the form of gas in the pump sump, and recirculating the wastewater via the recirculation channel from the pump sump to the pre-chamber if the measured content of harmful fluids in the form of gas in the pump sump exceeds a predetermined value.

Thus, the present invention is based on the insight that by increasing the contact area and the accumulated contact time between the wastewater and the air volume present in prechamber, before the effluent wastewater leave the pump station arrangement, larger amounts of the harmful fluids will set free from the wastewater and react with the oxygen in the prechamber and thereafter be dissolve as an harmless fluid in the effluent wastewater.

According to a preferred embodiment of the present invention, the pump sump comprises at least one pump that is connected to the outlet of the pump sump and connected to said recirculation channel. This entail that the pump that is installed in the pump sump is also used to recirculate the wastewater to the pre-chamber.

According to a preferred embodiment the pre-chamber is hermetically sealed towards the surrounding atmosphere.

Preferably the predetermined value of the content of harmful fluids in the form of gas is a predetermined Short Term Exposure Limit (STEL). Above this limit, no personal is allowed to work in the pump sump.

In a preferred embodiment the pump station arrangement comprises a second gas sensor arranged in the pre-chamber and configured to measure the content of hydrogen sulfide in the form of gas in the pre-chamber. Thereby an early signal of increasing content of the harmful fluids in the influent wastewater can be obtained, and recirculation can be started before the measured content of harmful fluids in the pump sump is above the predetermined value.

In a preferred embodiment the pump station arrangement comprises a gas pump configured to transport gas from the pump sump to the pre-chamber, in order to increase the content of oxygen in the pre-chamber.

It is also preferred that the pump station arrangement comprises a diffusor unit arranged at the bottom of the prechamber, in order to provide oxygen to the pre-chamber.

Further advantages with and features of the invention will be apparent from the other dependent claims as well as from the following detailed description of preferred embodiments.

BRIEF DESCRIPTION OF THE DRAWING

A more complete understanding of the abovementioned and other features and advantages of the present invention will be apparent from the following detailed description of preferred embodiments in conjunction with the appended drawing, wherein the FIGURE is a schematic, cross sectional view of an inventive pump station arrangement according to a preferred embodiment.

DETAILED DESCRIPTION OF PREFERRED EMBODIMENTS

The present invention relates in general to the handling and transportation of wastewater, especially in connection to a conventional pump station. By wastewater is especially intended wastewater emanating from households, which wastewater among other things comprises solid matter in the form of organic material. It should be realized that the term wastewater also includes the term sewage and other equivalent terms such as industrial waste, etc.

Reference is made to the FIGURE, which discloses an inventive pump station arrangement, generally designated 1, configured to remove harmful fluid from the wastewater passing through the pump station arrangement 1. The pump station arrangement 1 comprises two major units, i.e. a pre-chamber 2 and a pump sump 3. The pre-chamber 2 is in practice constituted by a pre-station vessel and the pump sump 3 is in practice constituted by a conventional pump station vessel.

The object of the pump station arrangement 1 is to remove harmful fluids, for instance and especially hydrogen sulphide (Has), from the influent wastewater by having the harmful fluids to react with oxygen in the pre-chamber 2 by means of microorganisms and then the neutralized harmful fluids are dissolved in the wastewater, transported to the pump sump 3 and then pumped away as effluent wastewater. The term harmful fluid comprises at first hand hydrogen sulphide ($H_2S$) in gaseous phase or in liquid phase, which shall be treated as equivalent terms in this herein.

It shall be pointed out that the pre-chamber 2 is preferably located in close connection with the pump sump 3, otherwise the harmful fluids risk to once again develop during the transportation of the wastewater from the pre-chamber 2 to the pump sump 3, which transportation takes place under the influence of gravity. However, the distance shall be long enough to secure that the neutralized harmful fluids, i.e. the hydrogen sulphide that has been transformed to for instance sulphuric acid and/or other oxidized sulphur species, manage to become dissolved at low concentration in the wastewater. A preferred distance L between the pre-chamber 2 and the pump sump 3 is equal to or more than 20 meters, and equal to or less than 30 meters. Oxygen present downstream the pre-chamber 2, for instance in said pump sump 3, will be able to move upstream into the pre-chamber 2 during certain conditions and thereby add oxygen to the wastewater housed in the pre-chamber 2, as will be described hereinbelow.

The pre-chamber 2 is configured for temporarily house wastewater, and comprises a bottom 4, a circumferential wall 5 extending upwards from said bottom 4 and having an upper edge 6. The pre-chamber 2 comprises an inlet 7 for influent wastewater/liquid and an outlet 8, and a detachable lid 9. Preferably the pre-chamber 2 is hermetically sealed towards the surrounding atmosphere, i.e. the lid 9 is in air tight engagement with the upper edge 6 of the circumferential wall 5 of the pre-chamber 2 during normal operation. The lid 9 shall be locked during normal operation, since the levels of the harmful fluids may by at toxic levels. Preferably, the prechamber 2 is made of glass fibre, plastics, or other such corrosion-resistant material.

According to the preferred embodiment the inlet 7 of the pre-chamber 2 in the vertical direction is arranged at a level above the outlet 8 of the pre-chamber 2. The inlet 7 is intended to be connected to an incoming conduit 10, wherein a mixture of a flow of incoming wastewater and a flow of harmful fluids are conveyed into the pre-chamber 2, thereto the outlet 8 is intended to be connected to an intermediate conduit 11 in order to admit an outflow of wastewater to the pump sump 3. The harmful fluids arriving to the pre-chamber 2 can be dissolved in the influent wastewater or be in the form of gas.

Since the inlet 7 of the pre-chamber 2 is located above the outlet 8 of the pre-chamber 2, through which outlet 8 the wastewater will be transported via the intermediate conduit 11 form the pre-chamber 2 to the pump sump 3, the influent wastewater will splash when entering the pre-chamber 2. When the wastewater splash in the pre-chamber 2 the dissolved hydrogen sulphide will be released into the form of gas.

In order to improve the release of dissolved harmful fluids, the pre-chamber 2 preferably comprises a stationary distribution plate 12 that is arranged direct under said inlet 7 and in a vertical direction arranged at a level above said outlet 8. The distribution plate 12 presents an upper surface arranged to receive and distribute the influent wastewater, and a peripheral edge 13 over which the wastewater is intended to flow. During operation the incoming flow of wastewater will leave the inlet 7 and flow/splash down to the upper surface of the distribution plate 12, whereupon the flow will be distributed over said upper surface.

When the wastewater enters the pre-chamber 2 the hydrogen sulphide in gaseous phase will leave the inlet 7 and be collected in the gas volume present above the wastewater housed in the pre-chamber 2.

When the wastewater flow/splash down onto the upper surface of the distribution plate 12, the wastewater is distributed over said upper surface and thereafter the wastewater flows over the peripheral edge 13 of the distribution plate 12 and further towards the bottom 4 of the prechamber 2, the contact area/interface between the wastewater and the gas volume in the pre-chamber 2 is increased. This in its turn entail that the hydrogen sulphide present in the liquid phase more easily will be transformed to the gaseous phase in the gas volume above the wastewater.

In the moist/humid gas layer above the wastewater in the pre-chamber 2 the hydrogen sulphide will react/oxidize with the available oxygen by means of micro organism and transform into sulphuric acid, according to the formula $H_2S+2O_2 \rightarrow H_2SO_4$, and/or other oxidized sulphuric species, wherein the sulphuric acid will condense at the wall 5 of the pre-chamber 2, trickle downwards and become dissolved in the wastewater. Thus, the content of harmful fluids in the wastewater in the pre-chamber 2 is reduced and instead wastewater having a low concentration of sulphuric acid ($H_2SO_4$), and/or other oxidized sulphuric species, and thereto acceptable levels of hydrogen sulphide is obtained.

Preferably the distribution plate 12 is connected to and projects at an angle to the wall 5 of the pre-chamber 2, as is shown in the FIGURE. In the preferred embodiment disclosed in the FIGURE the upper surface of the distribution plate 12 is flat and inclined in relation to a horizontal plane, which angle of inclination is preferably equal to or more than 30 degrees and equal to or less than 60 degrees. In an alternative not disclosed embodiment the peripheral edge of the distribution plate 12 may be arched upwards.

Furthermore the distribution plate 12 preferably comprises at least one distribution bracket 14 that is connected to and projects upwards at an angle to the upper surface of the distribution plate 12. The object of said at least one distribution bracket 14 is to further guarantee that the wastewater is distributed evenly over the upper surface of the distribution plate 12.

In the shown embodiment a pipe elbow 15 is arranged in connection to the inlet 7, having the purpose of directing the influent wastewater towards the upper surface of the distribution plate 12. The pipe elbow 15 is in the shown embodiment a 90 degrees pipe elbow turned downwards. However, it is possible to have said pipe elbow turned upwards in order to obtain a greater spread when the wastewater leaves the outlet 7 and more splash effect when the wastewater hits the upper surface of the distribution plate 12. The presence of a pipe elbow is preferred when the influent wastewater originates from a pressurized sewage system.

In the preferred embodiment disclosed in the FIGURE, the pre-chamber 2 comprises an aerator 16 arranged at the bottom 4 of the pre-chamber 2. The aerator 16 is arranged to add gas bubbles to the wastewater in the pre-chamber 2, in order to add oxygen to the air volume above the wastewater. The aerator 16 also provides mixing of the wastewater in the pre-chamber 2, in order to keep solid matter suspended. The aerator 16 may be operated continuously or intermittent, depending on the access and demand of oxygen in the pre-chamber 2. The aerator 16 is in the shown embodiment a so-called disc diffuser comprising a membrane having a large number of holes/slits through which compressed air is forced forming small bubbles of air/gas. However, it shall be stated that also other types of aerators can be used. Preferably, the aerator 16 in the vertical direction is arranged at a level below the outlet 8, in order to secure that the wastewater covers the aerator 16.

The pump sump 3 is basically configured for receiving wastewater and for pumping the wastewater towards a wastewater treatment plant. The pump sump 3 comprises a bottom 17, a circumferential wall 18 extending upwards from said bottom 17 and having an upper edge 19. The pump sump 3 comprises an inlet 20, an outlet 21 for effluent wastewater, and a detachable lid 22. Preferably, the pump sump 3 is vented to the surrounding atmosphere in order to have automatic access to oxygen. Preferably, the pump sump 3 is made of glass fibre, plastics, or other such corrosion-resistant material.

The inlet 20 of the pump sump 3 is in fluid communication with the outlet 8 of the pre-chamber 2 via the intermediate conduit 11, in such a way that the wastewater in the pre-chamber 2 due to gravity will flow via the intermediate conduit 11 from the pre-chamber 2 to the pump sump 3. Thus, the inlet 20 of the pump sump 3 is in the vertical direction arranged at a level below the outlet 8 of the pre-chamber 2. If the distance L is too short between the pre-chamber 2 and the pump sump 3, the inclination of the intermediate conduit 11 will be steeper and then the hydrogen sulphide in the form of gas that is heavier than air will flow to quickly from the pre-chamber 2 to the pump sump 3 via the intermediate conduit 11.

The pump sump 3 comprises at least one pump 23 for pumping the wastewater from the pump sump 3 in the downstream direction towards a wastewater treatment plant, i.e. said at least one pump 23 is connected to the outlet 21 of the pump sump 3.

If the wastewater level in the pump sump 3 is above the inlet 20 of the pump sump 3, no gas/air will be able to automatically flow from the pump sump 3 to the pre-chamber 2 via the intermediate conduit 11. For such circumstances, the pump station arrangement 1 preferably comprises a gas pump 24, configured to pump gas/air from the pump sump 3 to the prechamber 2. In the disclosed embodiment the gas pump 24 is connected to the aerator 16 of the pre-chamber 2 via an air hose 25, however it shall be pointed out that the aerator 16 may be provided with air/oxygen from other sources, such as the atmosphere. According to another embodiment, the air hose 25 mouth in the pre-chamber 2 in the vertical direction above the outlet 8. Preferably, said gas pump 24 is located in the pump sump 3. However, it shall be pointed out that also other locations are conceivable such as outside the pump sump 3, and in such installations a suction hose (not disclosed) is extending from the pump sump 3 to the gas pump 24.

In a preferred embodiment the air hose 25 is arranged in a casingtube 25a extending from the pre-chamber 2 to the pump sump 3. The casingtube 25a guarantee that there is no overpressure in the pre-chamber 2, for instance if the pump 23 in the pump sump 3 is inactive due to for instance power failure and the pre-chamber 2 is continuously provided with wastewater the gas in the pre-chamber 2 can be pressed via the casingtube 25a to the pump sump 3.

The inventive pump station arrangement 1 comprises a recirculation channel 26 extending from the pump sump 3 to the pre-chamber 2. Preferably, the recirculation channel 26 has an opening 27 in the pre-chamber 2 that in the vertical direction is arranged at a level above the outlet 8 of the pre-chamber 2, for the same reasons as why the inlet 7 of the pre-chamber 2 is located above said outlet 8.

Thereto, the inventive pump station arrangement 1 comprises a gas sensor 28 arranged in the pump sump 3 and configured to measure the content of harmful fluids in the form of gas in the pump sump 3. Preferably the content of harmful fluids in the form of gas in the pump sump 3 is measured in parts per million (ppm).

The pump station arrangement 1 is configured to recirculate the wastewater via the recirculation channel 26 from the pump sump 3 to the pre-chamber 2 if the measured content of harmful fluids in the form of gas in the pump sump 3 exceed a predetermined value. According to a preferred embodiment the pump station arrangement 1 during normal operation is configured to keep the outlet 21 of the pump sump 3 closed and the recirculation channel 26 open if the measured content of harmful fluids in the form of gas in the pump sump 3 exceed said predetermined value. According to yet another preferred embodiment the pump station arrangement 1 during normal operation is configured to keep the outlet 21 of the pump sump 3 open and the recirculation channel 26 closed if the measured content of harmful fluids in the form of gas in the pump sump 3 is below said predetermined value.

According to the preferred embodiment disclosed in the FIGURE, the recirculation channel 26 is connected to the at least one pump 23 in the pump sump 3. In order to control the flow of wastewater from the pump 23, the pump sump 3 comprises a controllable valve 29 that is configured to direct the wastewater. According to an alternative embodiment a separate (not shown) pump is connected to the recirculation channel 26.

Said predetermined value of the decisive threshold limit of the content of harmful fluids in the form of gas in the pump sump 3 is at least a so-called ceiling value that is an absolute exposure limit that shall never be exceeded. Preferably the predetermined value is a so-called Short Term Exposure Limit (STEL), for instance in some jurisdictions 15 ppm or 10 ppm. In an alternative embodiment the predetermined value is a so-called Time Weighted Average (TWA) limit, for instance in some jurisdictions 10 ppm or 5 ppm. The STEL-limit allows short exposure, for instance an exposure of a maximum of 15 minutes, which cannot be repeated more than 4 times per day with at least 60 minutes between exposures. The TWA-limit allows exposure 8 h/day and a maximum of 40 h/week.

In order to obtain an early warning/signal the pump station arrangement 1 may also comprise a second gas sensor 30 arranged in the pre-chamber 2 and configured to measure the content of harmful fluids in the form of gas in the prechamber 2. Thereby, recirculation may be started before the threshold limit in the pump sump 3 is exceeded. The value of the content of harmful fluids in the pre-chamber 2 increase rapidly for instance to 400-500 ppm when influent wastewater arrives that transports a large amount of harmful fluids.

The pump station arrangement 1 preferably comprises an external control unit 31, which may be operatively connected to the pump 23, the gas pump 24, the gas sensor 28, the controllable valve 29, the second gas sensor 30, etc.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and thus the equipment may be modified in all kinds of ways within the scope of the appended claims.

It shall also be pointed out that all information about/concerning terms such as above, under, upper, lower, etc., shall be interpreted/read having the equipment oriented according to the FIGURES, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

The invention claimed is:

1. A pump station arrangement in a wastewater transportation system, wherein the pump station arrangement comprises:
    a pre-chamber having an inlet for influent wastewater connected to one or more households and an outlet,
    a pump sump having an outlet connected to a sewage system or to a sewage treatment plant for effluent wastewater, and an inlet that is in fluid communication with the outlet of the pre-chamber by an intermediate conduit such that wastewater is transported from the pre-chamber to the pump sump under the influence of gravity through the intermediate conduit,
    at least one pump connected to the outlet of the pump sump and to a recirculation channel extending from the pump sump to the pre-chamber, and
    a gas sensor arranged in the pump sump and configured to measure the content of hydrogen sulphide ($H_2S$) in the form of gas in the pump sump,
    wherein the pump station arrangement is configured to remove hydrogen sulphide ($H_2S$) in gaseous phase or in liquid phase from the wastewater by transformation of the H2S by oxidation to an oxidized sulphuric species by recirculating wastewater via the recirculation channel from the pump sump to the pre-chamber if the measured content of $H_2S$ in the form of gas in the pump sump exceeds a predetermined value.

2. The pump station arrangement according to claim 1, wherein the inlet of the pre-chamber is arranged in a vertical direction at a level above said outlet of the pre-chamber.

3. The pump station arrangement according to claim 1, wherein the recirculation channel has an opening in the pre-chamber that is arranged in a vertical direction at a level above the outlet of the pre-chamber.

4. The pump station arrangement according to claim 1, wherein during normal operation, the pump station arrangement is configured to keep the outlet of the pump sump closed and the recirculation channel open if the measured content of hydrogen sulphide ($H_2S$) in the form of gas in the pump sump exceeds said predetermined value.

5. The pump station arrangement according to claim 1, wherein the pre-chamber is hermetically sealed from the surrounding atmosphere.

6. The pump station arrangement according to claim 1, wherein the inlet of the pump sump is arranged in the vertical direction at a level below the outlet of the pre-chamber.

7. The pump station arrangement according to claim 1, wherein the gas sensor is configured to measure content of hydrogen sulphide ($H_2S$) in the form of gas in the pump sump in parts per million (ppm).

8. The pump station arrangement according to claim 1, wherein the predetermined value is either a predetermined Short Term Exposure Limit (STEL) or a predetermined Time Weighted Average (TWA) limit.

9. The pump station arrangement according to claim 1, wherein the pump station arrangement comprises a second gas sensor arranged in the pre-chamber and configured to measure the content of hydrogen sulphide ($H_2S$) in the form of gas in the pre-chamber.

10. The pump station arrangement according to claim 1, wherein the pump station arrangement comprises a gas pump configured to transport gas from the pump sump to the pre-chamber.

11. The pump station arrangement according to claim 10 further comprising an aerator at the bottom of the pre-chamber that is configured to be supplied with pressurized gas from said gas pump.

12. The pump station arrangement according to claim 10, wherein the gas pump is located in the pump sump.

13. The pump station arrangement according to claim 1, wherein a distance between the pump sump and the pre-chamber is in a range of greater than or equal to 20 meters to less than or equal to 30 meters.

14. The pump station arrangement of claim 2, wherein the pre-chamber comprises an air volume and the recirculation channel extends from the pump sump to an opening in the pre-chamber located in the air volume.

15. The pump station arrangement of claim 14, further comprising a distribution plate arranged directly under said inlet of the pre-chamber and in a vertical direction at a level above said outlet of the pre-chamber.

16. The pump station arrangement of claim 15, wherein the inlet for the influent wastewater is arranged so that the influent wastewater flows or splashes down onto the upper surface of the distribution plate from said inlet of the pre-chamber.

17. The pump station arrangement of claim 11, wherein said gas pump is connected to said aerator via an air hose, and said air hose is arranged in a casing tube extending from the pre-chamber to the pump sump.

18. The pump station arrangement of claim 10, further comprising a suction hose extending from the pump sump to the gas pump.

19. The pump station arrangement of claim 1, wherein the inlet is configured to receive influent wastewater from a plurality of households.

20. The pump station arrangement of claim 10, wherein the at least one pump consists of a single pump located in the pump sump and connected to both the outlet of the pump sump and to the recirculation channel, with a controllable valve positioned between the pump and respective connections to the outlet and to the recirculation channel to direct flow from the pump.

21. The pump station arrangement of claim 10, wherein the at least one pump comprises a first pump connected to the outlet of the pump sump and a second pump connected to the recirculation channel.

* * * * *